Nov. 15, 1960

C. M. AUBLE ET AL 2,960,002

INSTRUMENT FOR THE QUANTITATIVE MEASUREMENT OF
RADIATION AT MULTIPLE WAVE LENGTHS

Filed May 16, 1958

INVENTORS
CARMON M. AUBLE
MARCUS F. HEIDMANN

BY
R. J. Tompkins
ATTORNEY

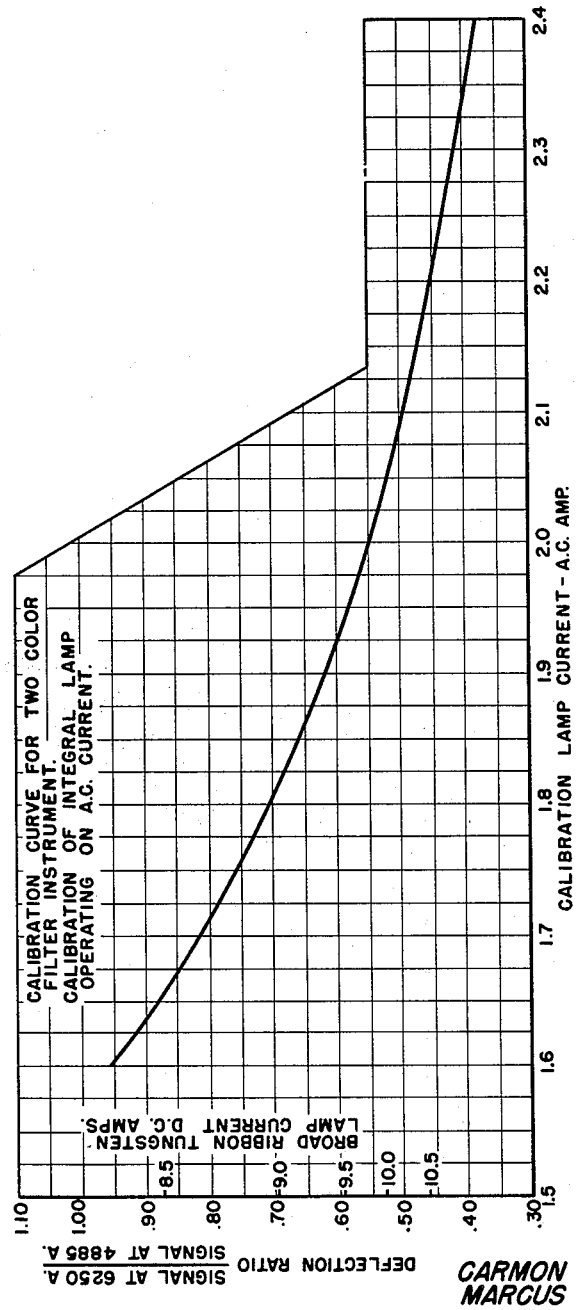

Patented Nov. 15, 1960

2,960,002

INSTRUMENT FOR THE QUANTITATIVE MEASUREMENT OF RADIATION AT MULTIPLE WAVE LENGTHS

Carmon M. Auble, Los Angeles, Calif. (8360 Bella Vista, Fair Oaks, Calif.), and Marcus Frank Heidmann, Bay Village, Ohio (3490 Higley Road, Rocky River 16, Ohio)

Filed May 16, 1958, Ser. No. 735,911

4 Claims. (Cl. 88—14)

(Granted under Title 35, U.S. Code (1952), sec. 266)

The invention described herein may be manufactured and used by or for the Government of the United States of America for governmental purposes without the payment of any royalties thereon or therefor.

This invention relates to apparatus for the measurement of the radiation of a hot body or gas such as may be developed by internal combustion engines, furnaces and miscellaneous equipment using high temperature processes. More particularly, the invention relates to simplified apparatus for determining the temperature of a hot body by simultaneous measurement of radiation from the hot body at two or more distinct wave lengths.

Optical apparatus for the comparison of different wave lengths of radiation from an emitting source has been heretofore provided to determine the intensity of radiation from the source. However, this prior art apparatus required the use of a carefully aligned lens system and spectroscope in which the maintenance of alignment and calibrations was difficult and required repetition after each movement of the instrument. Although this apparatus provided satisfactory measurements where the temperature of the source remained relatively constant, it was not found to provide highly accurate measurements where rapid temperature variations of the source were encountered, such for example as exist in the oscillatory and transient combustion conditions of liquid rocket engines. Moreover, the apparatus had considerable weight and size, making it difficult to move for measurements at different locations.

Accordingly, an important object of the invention is to provide radiation measurement apparatus, using determination of different spectral areas, in which lens systems and the necessary alignment of lenses in these systems are eliminated. Another object is to reduce the size, weight and number of required elements of the apparatus so that it may possess easy mobility and be readily manipulated for making measurements. An object, also, is to provide multiple wave length operated apparatus in which calibration may be accomplished without readjustment of the elements of the equipment and in which the calibrating elements form a permanently placed and integral part of the unit. A further object of this invention is to provide a new and improved optical two-color pyrometer for accurately measuring rapid temperature variations of a radiant energy source.

Other objects and many of the attendant advantages of this invention will be readily appreciated as the same becomes better understood by reference to the following detailed description when considered in connection with the accompanying drawings wherein.

Figure 1:
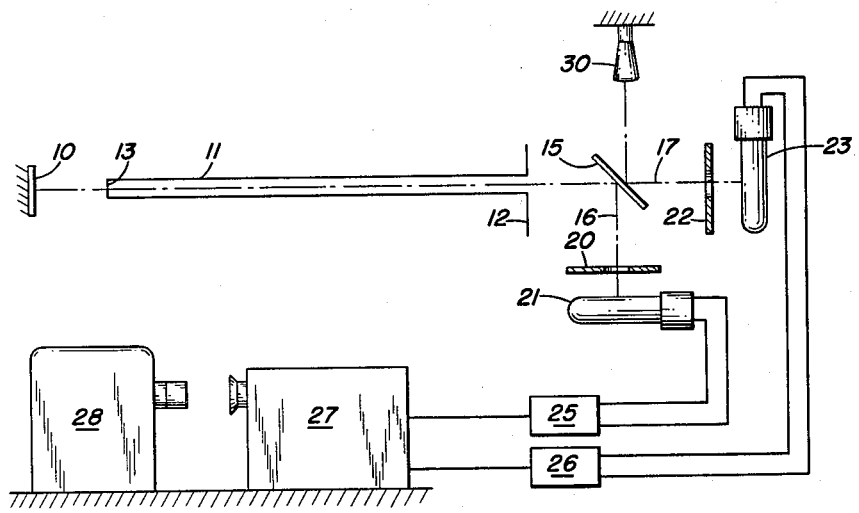
Fig. 1 is a schematic view of the temperature measuring apparatus according to the present invention.

Referring now to the drawings wherein like reference characters designate identical or corresponding parts throughout the several views, and more particularly to Fig. 1 of the drawing a schematic arrangement of the apparatus is shown in which the numeral 10 indicates a radiation source, such as a flame from the open tube end of a rocket engine combustor. An elongated straight tube 11 projects from a casing 12, the open end 13 of the tube being positioned in line with the flame, so that light emanating therefrom passes through the tube wherein it is collimated and upon exit from the tube impinges on a dichroic mirror 15, inside casing 12. The function of the dichroic mirror is to split the incident light into two component beams of different colors, or wave lengths, one beam 16 being reflected light and the other beam 17 being transmitted, and one beam being rich in blue, for example, and the other rich in red. These two colored beams pass through appropriate interference and blocking filters for narrowing the beams to essentially monochromatic light, reflected beam 16 passing through filter 20 and impinging on photocell 21, and beam 17 passing through filter 22 and impinging on photocell 23.

Photocell cells 21 and 23 are preferably of the multiplier type and are connected through respective cathode follower stages 25 and 26 dual channel cathode ray oscilloscope 27 provided with direct current amplifiers so that the signals can be observed visually, separately and simultaneously. The cathode follower stages 25 and 26 are preferably included to provide a uniform amplification of the electrical signals developed by photocells 21 and 23, respectively, for divers rates of radiation intensity variations. A camera is included to photographically record the signal traces appearing on the oscilloscope screen, the deflection of which traces is proportional to the intensity of the wavelengths impinging upon the respective photocells. In order to secure good resolution of the recorded signal when high frequency transients exist in the radiation intensity of the hot body source 10, a pulse-driven single sweep of the two oscilloscope beams of from 2- to 4-millisecond duration is preferably recorded with the oscilloscope camera, or, periodic interruptions of the oscilloscope beam may be used to obtain better synchronization of the two oscilloscope traces.

Figure 2:
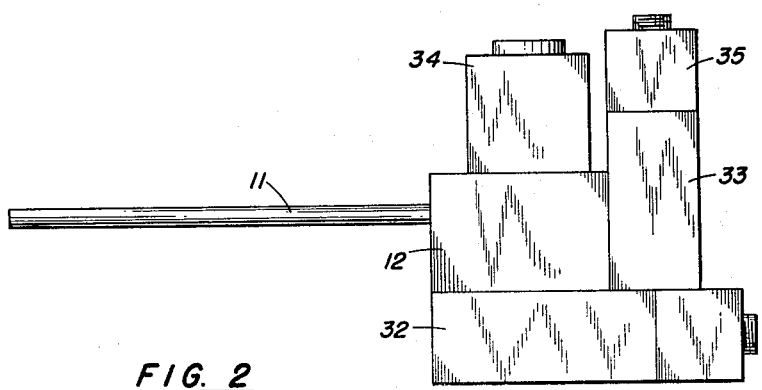
Fig. 2 is a view of the compact physical assembly of a major portion of the apparatus of Fig. 1; and, Fig. 3 is a graphical illustration of a calibration curve used in conjunction with this invention.

A calibrating lamp 30, the purpose and operation of which will be more fully explained hereinafter is positioned adjacent casing 12 in such relationship to the dichroic mirror that light from the lamp is reflected to photocell 23 along beam path 17, and transmitted through the mirror along beam path 16 to the photocell 21. Preferably the calibration lamp 30, as well as the photocells 21 and 23, and the dischroic mirror are housed separately in enclosing casings between which appropriate light path windows are provided, the assembled unit being shown in Fig. 2. In this figure, 12 is the mentioned casing containing the dichroic mirror and phototube filter mounts and filters 20 and 22, 32 is the casing for photocell 23, 34 is the housing for calibration lamp 30 and 35 is the assembly plate to which the casings are attached. It is apparent that when thus assembled, the various elements are all in fixed and permanent relationship to each other, an item of importance as will appear from the subsequent description.

Because of the unknown amplification factors involved in the conversion of light intensity into oscilloscope deflection, reference conditions of radiation intensity are required to evaluate the scale values of measured intensities. This is accomplished by permanent installation, in test relationship with the dichroic mirror, of the calibration lamp 30 and a calibration curve, as shown in Fig. 3, which curve indicates a calibrating lamp current value which produces the same trace deflection ratio on the oscilloscope for the selected componential wave lengths as the corresponding current value of a standard lamp, such for example as a broad ribbon tungsten lamp. From published data the absolute value of the intensity ratio at various currents of the standard lamp may be determined and these values are indicated by the left end marginal ordinate of the Fig. 3 curve. The calibrating lamp may now be used as a reference element for the intensity ratio when making flame measurements, the deflection ratio for the calibrating lamp representing a certain value of intensity ratio which may be obtained from published data. The intensity ratio for the flame can then be obtained from the following proportionality equation:

$$\left(\frac{\text{Intensity ratio}}{\text{Deflection ratio}}\right) \text{calibrating lamp} = \left(\frac{\text{Intensity ratio}}{\text{Deflection ratio}}\right) \text{flame}$$

since flame temperature is directly related to this intensity ratio.

In operation, therefore, for flame temperature determination, a base line record is initially made on the negative of camera 28 for zero radiation, followed by a calibration lamp record for a known lamp current for the selected componential wavelengths and, subsequently, a record of the flame or other radiation source for the selected componential wavelengths.

From the calibration record together with the current of the calibration lamp and the calibration curve of Fig. 3, the deflection ratio of the calibration lamp is determined and the corresponding intensity ratio is then obtained. Since the deflection ratio of the flame is shown by the graph, the intensity ratio for the flame may be obtained by substitution of values in the above mentioned equation, thus giving the temperature of the radiant energy source 10.

It is important to observe, that due to the permanent placment of the calibration lamp 30 in operative relation to the equipment there is no need to break the normal set up of the optical elements at each take of the apparatus; and, in addition, since lenses are unnecessary, the requirement for careful alignments and readjustments are eliminated.

Obviously many modifications and variations of the present invention are possible in the light of the above teachings. For example, three or more wave lengths using two or more mirrors might be employed; and alternate elements may be substituted, such as a beam splitter or half-silvered mirror for the dichroic mirror and other photosensitive devices for the phototubes. It is therefore to be understood that within the scope of the appended claims the invention may be practiced otherwise than as specifically described.

What is claimed is:

1. Apparatus for measurement of the radiation intensity of a radiant energy source comprising an elongated tubular device having one end thereof adjacent the radiant energy source for collimating the radiation therefrom, a dichroic mirror positioned adjacent the other end of said device for separating the collimated radiation into a pair of rays of different wave lengths, a calibration lamp positioned at a fixed spatial distance from said dichroic mirror for producing a source of radiant energy which after incidence upon said dichroic mirror is separated into a pair of rays of said different wave lengths of known intensities, a pair of photocells so positioned relative to said dichroic mirror as to be acted upon by the beams reflected and transmitted by said mirror thereby to develop electrical signals having an amplitude representative of the magnitude of the respective beam, a dual channel cathode ray oscilloscope electrically coupled to said pair of photocells for alternatively displaying the developed pair of electrical signals of the energy source and said calibration lamp simultaneously and separately, and a camera for recording the alternative displays in a manner to provide a comparison record of the magnitudes of said electrical signals wherefrom the radiation intensity of the radiant energy source is determined.

2. Apparatus according to claim 1, and including a filter interposed between said dichroic mirror and each of said pair of photocells to restrict the wave length of each of said pair of rays to essentially monochromatic radiant energy.

3. Apparatus according to claim 1, and including a cathode follower stage electrically interposed between each of said pair of photocells and each channel of said dual channel cathode ray oscilloscope.

4. Apparatus according to claim 1, and including means for superimposing periodic markers on the electrical signals displayed by said cathode ray oscilloscope.

References Cited in the file of this patent

UNITED STATES PATENTS

| | | |
|---|---|---|
| 2,237,713 | Russell | Apr. 8, 1941 |
| 2,494,607 | Bouchet | Jan. 17, 1950 |
| 2,561,612 | Culver | July 24, 1951 |
| 2,645,971 | Herbst | July 21, 1953 |
| 2,680,200 | Hercock | June 1, 1954 |
| 2,832,072 | Hales et al. | Apr. 22, 1958 |

FOREIGN PATENTS

| | | |
|---|---|---|
| S 44,212 | Germany | June 7, 1956 |